Jan. 5, 1965  J. D. NAGLE ETAL  3,164,485
METHOD OF FORMING POLYETHYLENE GASKETS IN CONTAINER CLOSURES
Filed Oct. 31, 1962
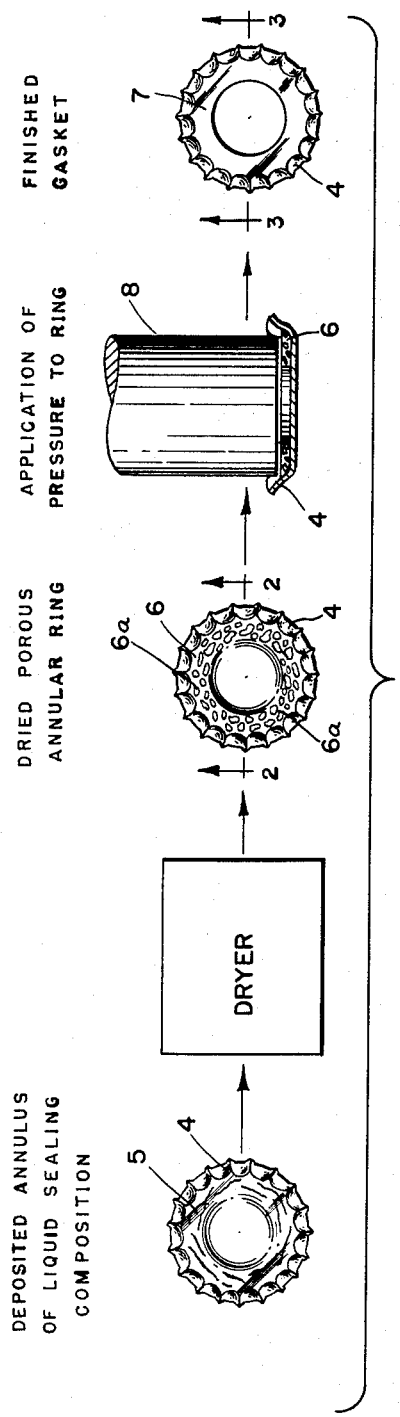
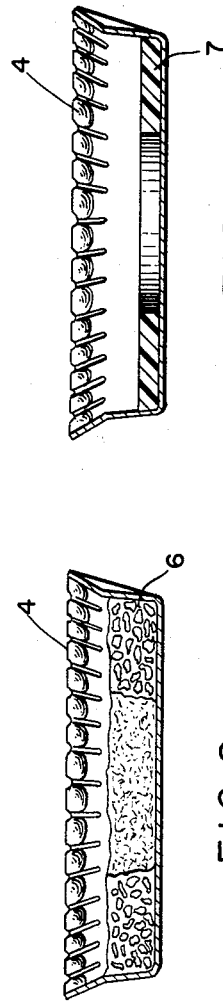

United States Patent Office 3,164,485
Patented Jan. 5, 1965

3,164,485
METHOD OF FORMING POLYETHYLENE GASKETS IN CONTAINER CLOSURES
John D. Nagle, Belmont, and Charles W. Simons, Bedford, Mass., assignors to W. R. Grace & Co., Cambridge, Mass., a corporation of Connecticut
Filed Oct. 31, 1962, Ser. No. 234,494
3 Claims. (Cl. 117—43)

This invention relates to a method of forming sealing gaskets in container closures. In one particular aspect, it relates to a method for forming substantially inert sealing gaskets in metal or plastic caps to be applied to glass jars or bottles.

This application is a continuation-in-part of the copending application "Method of Producing Gaskets for Container Closures," Serial No. 193,628, filed May 9, 1962, now Patent number 3,118,783, granted Jan. 21, 1964.

A large proportion of container closures are provided with rubbery gaskets which have been deposited on the closures in the form of a liquid sealing composition and then solidified. While the rubbery gaskets so formed give generally satisfactory sealing performance, they also have certain drawbacks both in the method of their application and in the characteristics of the finished gaskets.

The gaskets used in caps and similar removable container closures must be quite thick in order to provide an adequate seal. Consequently, a heavy layer of liquid sealing composition must be deposited on the closure and then converted to solid form. The liquid compositions used for the production of such gaskets have been for the most part either water dispersions of suitable elastomers or plastisol compositions. In a few cases, heavy, doughlike mixtures of rubber, filler and a rubber solvent have been used. The water-based compositions require a substantial time for drying, often 60 to 90 minutes. Solvent-based compositions ordinarily require an even longer drying time, two hours or more representing a normal drying cycle for gaskets of this type. As a consequence, the use of solvent-based compositions for this purpose has been severely limited. Plastisol compositions require a relatively short time for fluxing or heat-setting, but the range of materials which may be used in such compositions is very narrow.

Recent developments in the technology of producing and handling elastomeric polymers have made possible the production of solutions and dispersions of the polymers in organic liquid vehicles which, except for the above-described length drying time, would be ideal for use as liquid sealing compositions to form gaskets for superior sealing ability and excellent adhesion to the container closure. Substitution of these materials for water-based or plastisol compositions would give greater latitude in the selection of elastomeric polymers and fillers, thus making it possible to use polymers of lower cost or those having special properties such as a high degree of resistance to the action of oils and solvents.

The copending application, Serial No. 193,628, provides a method for converting non-aqueous liquid-sealing compositions to gaskets having excellent sealing characteristics in a relatively short period of time. The gaskets are formed rapidly and economically and have the exact contours and placement desired for a given sealing application. Briefly stated, the method disclosed in the application comprises depositing an annulus of a non-aqueous liquid sealing composition in a closure, expelling the liquid from the composition at a rate which forms a residue having an open porous surface and containing a number of interconnected cells, and compressing the residue to collapse the cells and form a substantially coherent, solid gasket of the desired shape. The liquid sealing composition may be a solution or a dispersion of an elastomer in a suitable organic liquid vehicle. It may also be a dispersion of an elastomer in an organic solution of a second elastomer such as that described in U.S. 2,593,681.

One of the main requirements for a gasket for crowns is that it be substantially inert, that is, it must not add to or detract from the natural flavor and odor properties of the contents of the bottle. While the compositions disclosed in the copending application, Serial No. 193,628, provide excellent gaskets, it has now been discovered that a highly inert gasket can be rapidly and economically produced by using a non-aqueous liquid sealing composition comprised of finely divided solid polyethylene dispersed in an organic solution of a substantially inert compatible polymer.

One embodiment of the present invention is shown in the accompanying drawing. FIGURE 1 is a diagrammatic view illustrating the successive steps of forming an annular gasket in a crown cap. FIGURE 2 is a cross-sectional view taken on line 2—2 of FIGURE 1 showing the porous dried sealing composition on an enlarged scale. FIGURE 3 is a cross-sectional view taken on line 3—3 of FIGURE 1 showing the finished gasket after compression of the porous composition.

While the invention is described with respect to the formation of an annular gasket, it is to be understood that the gasket may be of any desired configuration. For example, it may be an over-all lining of the crown.

According to the present invention, the method comprises depositing in the cap 4 an annulus of a liquid sealing composition 5 composed of finely divided solid polyethylene dispersed in an organic solution of a substantially inert compatible polymer, expelling the liquid from the composition at a temperature which softens the polyethylene and forms a residue 6 having an open porous surface and containing a number of interconnected cells 6a, and compressing the residue to collapse the cells and form a substantially coherent solid gasket 7 of form-maintaining shape.

Preferably, the inert polymer is polyisobutylene or substantially inert copolymers of isobutylene wherein the isobutylene is present in major amount. Unvulcanized butyl rubber made by copolymerizing at least 95 percent by weight of isobutylene with a diolefin, such as isoprene or butadiene, is satisfactory. The molecular weight of the isobutylene polymer is not critical and is dependent largely upon the type of gasket desired. The somewhat tacky solids having molecular weights from about 80,000 to 100,000 are preferred due to their plasticizing effect on the polyethylene. The isobutylene copolymer is soluble in solvents such as hexane at room temperature whereas polyethylene is not soluble in any solvent at room temperature. It is possible, therefore, to have a much higher polymer content in the sealing composition than would be possible if all the polymers were in solution.

The polyethylene can be prepared by any of the methods which are usually employed for the preparation of these polymers. The polyethylene produced by the high pressure, high temperature polymerization process disclosed in U.S. 2,153,553 to Fawcett et al. is preferred because it is free of catalyst contaminators.

The molecular weight of the polyethylene should be at least 600° to provide tough, durable gaskets. Ethylene polymers with molecular weights below 6000 are too soft and waxy to provide dimensionally stable, abrasion resistant gaskets.

The particular ratio of the polymers in the sealing composition is dependent largely on the inertness requirements of the gasket. The polyethylene should be present in an amount equivalent to at least 50 percent by weight of the total polymers present to take advantage of its inertness characteristics. For highly inert gaskets, the polyethylene may be present in an amount as high as practicable for a flowed-in sealing composition, i.e. 90 percent by weight of the total polymers present. The polyethylene is non-toxic and inert to almost all materials which are placed in containers having closure caps, e.g., it is not attacked by beer, cola drinks or ginger ale. In addition, it is an effective binder for the isobutylene polymer and adheres well to the lacquer coating of the closure.

The organic liquid used in the sealing composition is not critical and depends largely on the solubility of the inert compatible polymer in the liquid, as well as the boiling point, toxicity, availability and cost of the organic liquid itself. Examples of satisfactory liquids are toluene, benzene, pentane, hexane, heptane, octane and the various aliphatic alcohols.

The liquid component of the sealing composition is expelled in a period of 10 minutes or less. During the normal lengthy drying operation of a liquid sealing composition, a continuous skin ordinarily forms over the surface of the composition and prolongs the drying period. In the instant invention however, the rapid rate of expelling the liquid prevents the formation of the skin.

The liquid component of the sealing composition may be expelled by a number of methods. Preferably, the liquid is evaporated at atmospheric pressure by subjecting the composition-containing closure to an elevated temperature. The temperature must be within the range which produces a puffed porous residue. It should also be high enough to soften the polyethylene. In general, temperatures between about 200° F. and 400° F. are satisfactory. At these temperatures, the gaskets ordinarily used for sealing glass jars and bottles require an amount of sealing composition which will dry in from one to three minutes and leave a puffed residue about 0.060 inch thick. The thickness of the metal or other material from which the container closure is made will have some influence on the speed of evaporating the liquid and consequently must be taken into account in determining the drying temperature. Drying is preferably carried out in an oven of the type described in United States Patent No. 2,610,131, in which heated, high velocity air is passed over the sealing composition.

The dry residue in the container closure is a coarse, open porous structure containing a large number of interconnected cells and a pervious, open surface through which the organic liquid has been expelled.

While the polyethylene is in a softened state, the residue is compressed to an essentially solid, coherent, form-maintaining gasket by any suitable means. A satisfactory method is to pass the residue-containing closure under a die which simultaneously compresses the residue and imparts the desired shape and dimensions of the gasket. The die is preferably at or below room temperature in order that it may quickly cool the softened polyethylene to a form-maintaining shape.

The compression step may be carried out at any pressure which is capable of disrupting the spongy residue structure and impressing the desired final shape of the gasket. Compression of the residue must be carried out as a separate step prior to the application of the closure to the container because the compressive force exerted by the lip of the container is not sufficient to form the gasket.

The compression step makes possible the production of a gasket of the exact contours required for a given sealing job, a result which is ordinarily difficult to achieve with flowed-in sealing gaskets. The gasket may, for example, have a perfectly flat sealing surface or it may, if desired, be provided with a bead at either its inside or outside peripheral edge. The gaskets have such a high degree of dimensional stability that they are able to maintain indefinitely the exact configuration imposed by the compression step. Placement of the gasket may also be determined during the compression step. As a result of the exact shaping and placement of the gasket during the compression step, it is possible to obtain good sealing with an amount of gasketing material substantially less than that ordinarily used.

As an alternative procedure for expelling the liquid from the sealing composition, the composition may be held under pressure at a temperature above the boiling point of the liquid until the composition is deposited on the closure. This may be accomplished, for example, by pumping the composition through a heat exchanger while holding it under sufficient pressure to maintain it in the liquid state. When the composition is applied to the closure, as by discharge from the nozzle of a lining machine, the sudden release from the pressurized condition forces the liquid to boil off, or flash off, so quickly that a dry open cellular residue results. The flash drying step will normally be found to form a completely dry residue. Usually the polyethylene component of the residue is in a softened state and no additional heating is necessary.

The sealing composition may be modified in various ways to facilitate the drying and compression steps, to impart the desired properties to the finished gasket and to reduce the cost of the gasket. For example, mineral fillers such as zinc oxide, calcium carbonate, barytes, talc, clay and the like may be added to the composition to aid in preventing formation of a film over the surface of the composition during drying, thus permitting the quick expulsion of the liquid. In addition, fillers also reduce the tackiness of the dried residue thereby preventing it from adhering to the die or other pressure tool which may be used in the compression step. Fillers may also be used to give greater bulk and specific sealing characterics to the finished gaskets. Other minerals such as gums, resins, antioxidants and the like may also be added to the liquid sealing compositions as desired.

Our invention will be more clearly understood by reference to the following example, in which all parts are by weight.

*Example*

20.0 grams of unvulcanized butyl rubber, a copolymer of isobutylene and isoprene having a maximum Mooney viscosity of 49 at 212° F., ("Enjay Butyl 165") were dissolved in 100 grams of hexane at room temperature. 80 grams of pulverized polyethylene ("Petrothene M-714") were dispersed in the butyl rubber solution. The dispersion was deposited in a series of inverted metal caps. The caps were were placed in an oven and subjected to temperatures ranging from about 200–300° F. for about 3 minutes. The residue in each cap was highly puffed and porous. The hot residue was compacted under a pressure of about 50 p.s.i. by placing a cold lid of a closure on top of the residue and squeezing them together. The gaskets compacted in this way were smooth, substantially solid and coherent. They had the appearance of gaskets dried under conventional conditions for at least 1½ hours.

We claim:
1. A method for preparing a gasket for a closure element which comprises depositing in the closure element an organic liquid sealing composition composed of 50 to 90 percent by weight of solid finely-divided polyethylene dispersed in a volatile organic solution of an isobutylene polymer, said polyethylene having a molecular weight of at least 6000, evaporating the liquid from the deposited composition at a temperature ranging from about 200 to 400° F. to soften and plasticize the polyethylene and form a residue comprised of a multiplicity of interconnected cells and having an open porous surface, and compressing the residue with means to concurrently cool the softened polyethylene and form a substantially solid coherent gasket of a form-stable configuration.

2. The method of claim 1 in which the isobutylene polymer is comprised of at least 95 percent isobutylene copolymerized with up to about 5 percent of a diolefin.

3. A method for preparing a gasket for a closure element which comprises heating a liquid organic sealing composition to a temperature above the boiling point of its liquid component under superatmospheric pressure to maintain it in the liquid state, said composition being composed of 50 to 90 percent by weight of solid finely-divided polyethylene dispersed in a volatile organic solution of an isobutylene polymer, said polyethylene having a molecular weight of at least 6000, said heating being sufficient to soften and plasticize the polyethylene, depositing the composition in the closure element at atmospheric pressure to flash evaporate the liquid to form a residue comprised of a multiplicity of interconnected cells and having an open porous surface, and compressing the residue with means to concurrently cool the softened polyethylene and form a substantially solid coherent gasket of a form-stable configuration.

References Cited in the file of this patent
UNITED STATES PATENTS

| | | |
|---|---|---|
| 1,427,133 | Taliaferro | Aug. 29, 1922 |
| 2,114,308 | McGowan et al. | Apr. 19, 1938 |
| 2,238,681 | Dorough | Apr. 15, 1941 |
| 2,336,944 | Madge et al. | Dec. 14, 1943 |
| 2,684,774 | Aichele | July 27, 1954 |
| 2,706,183 | Carter | Apr. 13, 1955 |
| 3,032,826 | Brillinger | May 8, 1962 |
| 3,037,474 | Navikas | June 5, 1962 |

FOREIGN PATENTS

| | | |
|---|---|---|
| 615,282 | Canada | Feb. 28, 1961 |

OTHER REFERENCES

Roff: "Fibers, Plastics, and Rubbers," 1956, London, Butterworth's Scientific Publications, pp. 137–141.

Golding: B "Polymers and Resins," New York, Van Nostrand Co., June 1959.